United States Patent
Gold

(10) Patent No.: US 6,374,081 B1
(45) Date of Patent: Apr. 16, 2002

(54) TRANSMISSION UNIT AND METHOD FOR TRANSMITTING AN INFORMATION ITEM, IN PARTICULAR FOR AN ANTI-THEFT PROTECTION SYSTEM OF A MOTOR VEHICLE

(75) Inventor: Peter Gold, Sinzing (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/370,231

(22) Filed: Aug. 9, 1999

Related U.S. Application Data

(63) Continuation of application No. PCT/DE98/03499, filed on Nov. 27, 1998.

(30) Foreign Application Priority Data

Dec. 9, 1997 (DE) .......................................... 197 54 649

(51) Int. Cl.⁷ ................................................ H04B 5/00
(52) U.S. Cl. ........................ 455/41; 455/99; 340/425.5; 340/539
(58) Field of Search ............................. 455/41, 42, 45, 455/48, 91, 95, 99; 340/425.5, 426, 427, 539, 540, 541, 571, 542

(56) References Cited

U.S. PATENT DOCUMENTS 4,511,888 A * 4/1985 Bernhardt .................. 340/571
4,559,529 A * 12/1985 Bernhardt .................. 340/571
5,859,590 A * 1/1999 Otani ......................... 340/540

FOREIGN PATENT DOCUMENTS

DE     195 42 441 A1   5/1997

* cited by examiner

Primary Examiner—Nay Maung
Assistant Examiner—Quochien B. Vuong
(74) Attorney, Agent, or Firm—Herbert L. Lerner; Laurence A. Greenberg; Werner H. Stemer

(57) ABSTRACT

A transmission unit includes a sine-wave generator that generates a carrier oscillation. A binary information item is modulated onto the carrier oscillation in a modulator. The modulated oscillation is fed to a transformer that forwards the modulated oscillation to a plurality of antennas connected in parallel. A method for transmitting an information item includes providing a generator having a primary side and a secondary side, a modulator, a transformer, and a plurality of antennas. The plurality of antennas is connected to the secondary side of the transformer. An information item to be transmitted is created. A sinusoidal carrier oscillation is generated. The information item is modulated onto the carrier oscillation and forms a modulated oscillation. The modulated oscillation is transformed from the primary side to the secondary side and an electromagnetic field is generated by the plurality of antennas to aid transmission of the information item. The transmission unit and the method for transmitting provide little interference radiation. The transmission unit and the method for transmitting may be used for an anti-theft protection system of a motor vehicle.

16 Claims, 2 Drawing Sheets

TRANSMISSION UNIT AND METHOD FOR TRANSMITTING AN INFORMATION ITEM, IN PARTICULAR FOR AN ANTI-THEFT PROTECTION SYSTEM OF A MOTOR VEHICLE

CROSS REFERENCE TO RELATED APPLICATION

This application is a continuation of copending International Application No. PCT/DE98/03499, filed Nov. 27, 1998, which designated the United States.

BACKGROUND OF THE INVENTION

Field of the Invention

The invention lies in the field of electronic signal transmission. The invention relates to a signal transmission unit and a method for transmitting an information item, in particular for an anti-theft protection system of a motor vehicle.

A known transmission unit (German Patent DE 195 42 441 A1) has at least one pair of coils disposed close together. A common control unit for the transmission of signals controls the two coils. The control unit is disposed close to the coils and between the two coils. Because vehicle-specific data are to be transmitted, a central controller feeds the vehicle-specific data to each respective control unit.

The vehicle-specific data are passed in binary form as square-wave signals through the wiring harness to the individual control units. The square-wave signals can have an interfering effect on other electrical equipment. This is because the square-wave signals have high-frequency harmonics with a non-negligible amplitude. The process of transmitting the vehicle-specific data can give rise to enormous EMC problems in the motor vehicle. In the known transmission unit, moreover, each coil pair requires its own separate control unit. If this was not the case, square-wave signals having even larger amplitudes would have to be passed to the coils so that a sufficiently large field with an adequate range could be generated. Accordingly, this would cause greater interference.

SUMMARY OF THE INVENTION

It is accordingly an object of the invention to provide a transmission unit and method for transmitting an information item, in particular for an anti-theft protection system of a motor vehicle, which overcomes the hereinaforementioned disadvantages of the heretofore-known devices of this general type and which is constructed in a simple manner and does not interfere with other electrical equipment, or does so only to a small extent.

The transmission unit of the invention has a generator that generates a sinusoidal carrier oscillation. A binary information item (corresponding to the vehicle-specific data) is modulated onto the carrier oscillation. A central transformer transforms the modulated oscillation from its primary side to its secondary side. In this case, the modulated oscillation is altered with regard to its amplitude. A plurality of antennas is connected to the secondary side, feeding the modulated oscillation to the antennas. The antennas generate an alternating field through which the vehicle-specific data are transmitted in modulated fashion.

With the foregoing and other objects in view, there is provided, in accordance with the invention, a transmission unit, having a generator for generating a sinusoidal carrier oscillation; a modulator for modulating an information item to be transmitted onto the carrier oscillation into a modulated oscillation; a transformer having a primary side and a secondary side for transforming the modulated oscillation from the primary side to the secondary side; and a plurality of antennas connected to the secondary side by which a respective electromagnetic field is generated for aiding transmission of the information item.

With the transmission unit, the antennas are fed only sinusoidal signals that have no harmonics or only harmonics with small amplitude. Therefore, the signals can be adapted in terms of their power to the antennas and an electromagnetic field generated by the signals can be adapted in terms of its range, without interference signals proceeding from the signals due to the data transmission to the antennas.

The transformer makes it possible for a plurality of antennas to be electrically disposed in parallel with the transformer. Therefore, the transformer can operate a plurality of antennas simultaneously. It is sufficient that the generator is a simple sine-wave oscillator generating the sinusoidal carrier oscillation. If the transformer is a step-up transformer, then the modulated oscillation is stepped up with regard to voltage and current, resulting in the generator generating a carrier oscillation with relatively small amplitudes. It is advantageous for the antennas to be constructed as coils, which are simple to produce and to mount at the fitting location.

In order to minimize the losses between the transformer and antennas, twisted two-wire lines are used. It is likewise possible to use two-pole, shielded lines, from which little interference radiation proceeds.

In accordance with another feature of the invention, the plurality of antennas are connected in parallel to the secondary side.

In accordance with a further feature of the invention, the generator is a sine-wave oscillator.

In accordance with an added feature of the invention, the transformer is a step-up transformer that steps up the modulated oscillation with regard to voltage and current.

In accordance with an additional feature of the invention, the plurality of antennas are coils in parallel with the secondary side and electrically connected to the secondary side.

In accordance with yet another feature of the invention, there is provided twisted two-wire lines, the plurality of antennas being electrically connected to the secondary side through the twisted two-wire lines.

In accordance with yet a further feature of the invention, there is provided a two-pole, shielded line, the plurality of antennas being electrically connected to the secondary side through the two-pole, shielded line.

With the objects of the invention in view, there is also provided a transmission unit of an anti-theft protection system of a motor vehicle, having a generator for generating a sinusoidal carrier oscillation; a modulator for modulating an information item to be transmitted onto the carrier oscillation into a modulated oscillation; a transformer having a primary side and a secondary side for transforming the modulated oscillation from the primary side to the secondary side; and a plurality of antennas connected to the secondary side by which a respective electromagnetic field is generated for aiding transmission of the information item.

With the objects of the invention in view, there is further provided a method for transmitting an information item, including the steps of providing a generator having a primary side and a secondary side, a modulator, a transformer, and a plurality of antennas; connecting the plurality of antennas to the secondary side of the transformer; creating an information item to be transmitted; generating a sinusoidal carrier oscillation; modulating the information item onto the carrier oscillation and forming a modulated oscillation; transforming the modulated oscillation from the primary side to the secondary side; and generating an electromagnetic field by the plurality of antennas to aid transmission of the information item.

In accordance with another mode of the invention, there is provided the step of connecting the plurality of antennas in parallel to the secondary side.

In accordance with a further mode of the invention, the step of providing the generator includes providing a sine-wave oscillator as the generator.

In accordance with an added mode of the invention, the step of providing the transformer includes providing a step-up transformer, and stepping up the modulated oscillation with regard to voltage and current with the step-up transformer.

In accordance with an additional mode of the invention, the step of providing the plurality of antennas includes providing coils, and electrically connecting the coils in parallel with the secondary side.

In accordance with yet another mode of the invention, there is provided the steps of providing twisted two-wire lines and electrically connecting the plurality of antennas to the secondary side through the twisted two-wire lines.

In accordance with yet a further mode of the invention, there is provided the step of providing a two-pole, shielded line, and electrically connecting the plurality of antennas to the secondary side through the two-pole, shielded line.

In accordance with a concomitant mode of the invention, there is provided a method for transmitting an information item in an anti-theft protection system of a motor vehicle, including the steps of providing a generator having a primary side and a secondary side, a modulator, a transformer, and a plurality of antennas; connecting the plurality of antennas to the secondary side of the transformer; creating an information item to be transmitted; generating a sinusoidal carrier oscillation; modulating the information item onto the carrier oscillation and forming a modulated oscillation; transforming the modulated oscillation from the primary side to the secondary side; and generating an electromagnetic field by the plurality of antennas to aid transmission of the information item.

Other features that are considered as characteristic for the invention are set forth in the appended claims.

Although the invention is illustrated and described herein as embodied in a transmission unit and a method for transmitting an information item, in particular for an anti-theft protection system of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

A transmission unit and method for transmitting according to the invention is explained below by way of example with reference to the use in an anti-theft protection system of a motor vehicle. Other, functionally identical uses in other objects are likewise possible.

An anti-theft protection system, such as keyless access control for a motor vehicle, has a transmission unit situated in the motor vehicle and a reception unit. The transmission unit transmits signals containing vehicle-specific data. If the data are received correctly by a portable code carrier, then the portable code carrier transmits encrypted, user-specific data back to the reception unit in the motor vehicle. The reception unit then checks the received data with regard to their authorization. In the event of authorization, various security units (i.e., immobilizer and door locks) or other electrical devices (i.e., light switches and electric motors) can be controlled.

Figure 1:
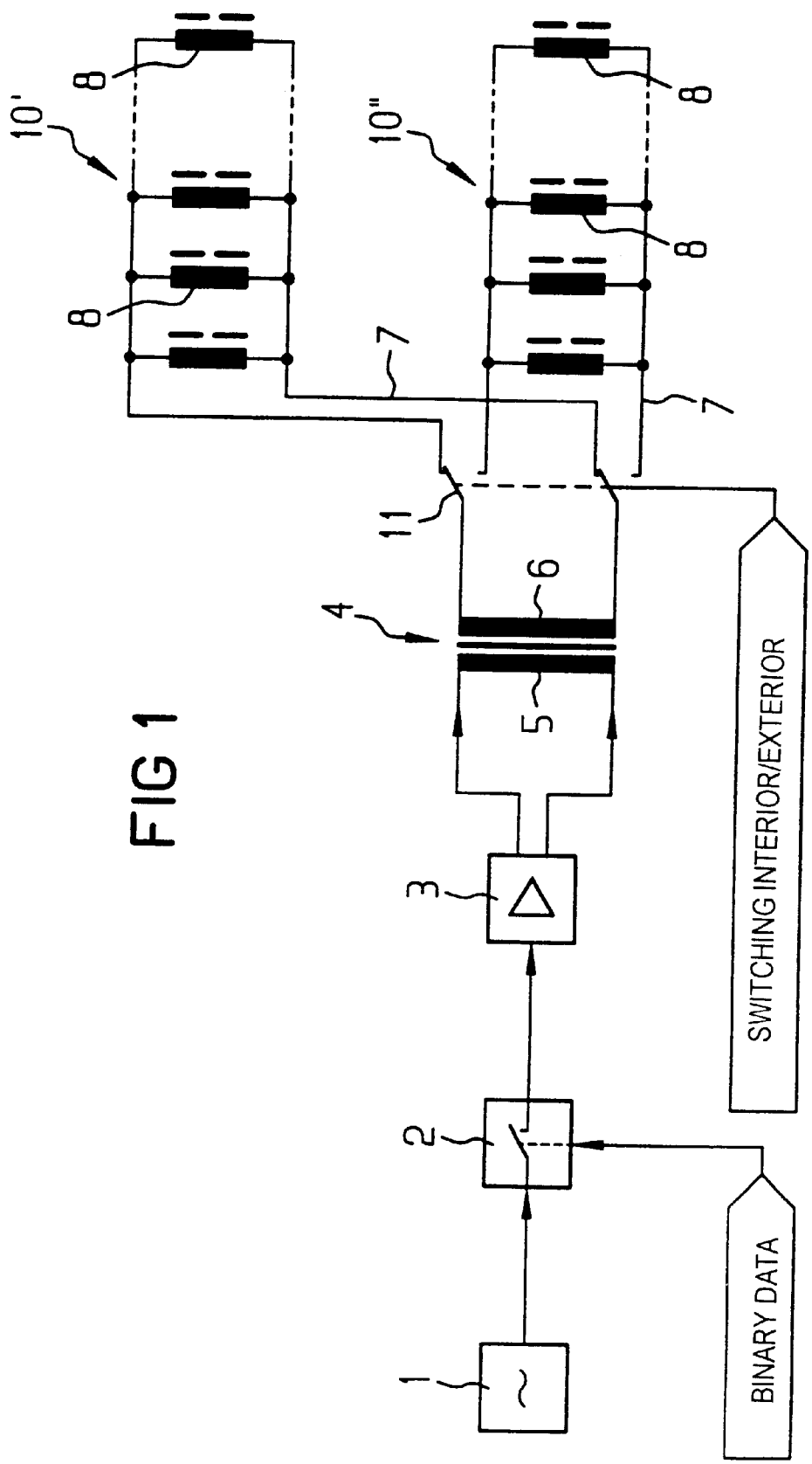
FIG. 1 is a block diagram of the transmission unit according to the invention.

Referring now to the figures of the drawings in detail and first, particularly to FIG. 1 thereof, there is seen a transmission unit having a generator 1, which preferably generates a sinusoidal carrier oscillation and feeds it to a modulator 2. Vehicle-specific data (low-frequency modulating oscillation) that are ultimately intended to be transmitted are also fed to the modulator 2. The data to be transmitted are modulated onto the high-frequency carrier oscillation in the modulator 2. Thus, a modulated oscillation containing the data is produced.

These data are specific to the motor vehicle so that only a code carrier associated with that motor vehicle can receive the data and can reply thereto.

If the amplitude of the modulated oscillation is still not large enough, the modulated oscillation is fed to an amplifier 3 (in this case a linear output stage) through which the modulated oscillation is amplified as far as possible without distortion. The amplified modulated oscillation is fed to a transformer 4, which transforms the modulated oscillation from its primary side to its secondary side. In this case, the amplitude of the modulated oscillation is adapted for transmission.

In the embodiment according to FIG. 1, the transformer 4 is configured as a step-up transformer with a primary winding 5 and a secondary winding 6. The transformer transforms the modulated oscillation from the primary winding 5 to the secondary winding 6 and, in the process, amplifies it with regard to voltage and current.

The transformed oscillation is passed through lines 7, placed in the motor vehicle, to one or more antennas 8. The antennas 8 generate an alternating electromagnetic field due to the modulated oscillation. This results in the transmission of the vehicle-specific data in a wire-free manner to the code carrier.

The antennas 8 are preferably constructed as coils with or without a ferrite core. Each antenna 8 generates an alternating field that is limited in terms of its range, usually about one to two meters. If a coil of the code carrier is located within the range of the magnetic field, then an alternating voltage, which is proportional to the modulated oscillation, is induced in the coil. The vehicle-specific data are obtained from the alternating voltage by demodulation.

The antennas 8 are connected up electrically in parallel with one another. This insures that all the antennas 8 are controlled with approximately the same power, disregarding the line losses on the line 7 to the antennas 8.

Figure 2:
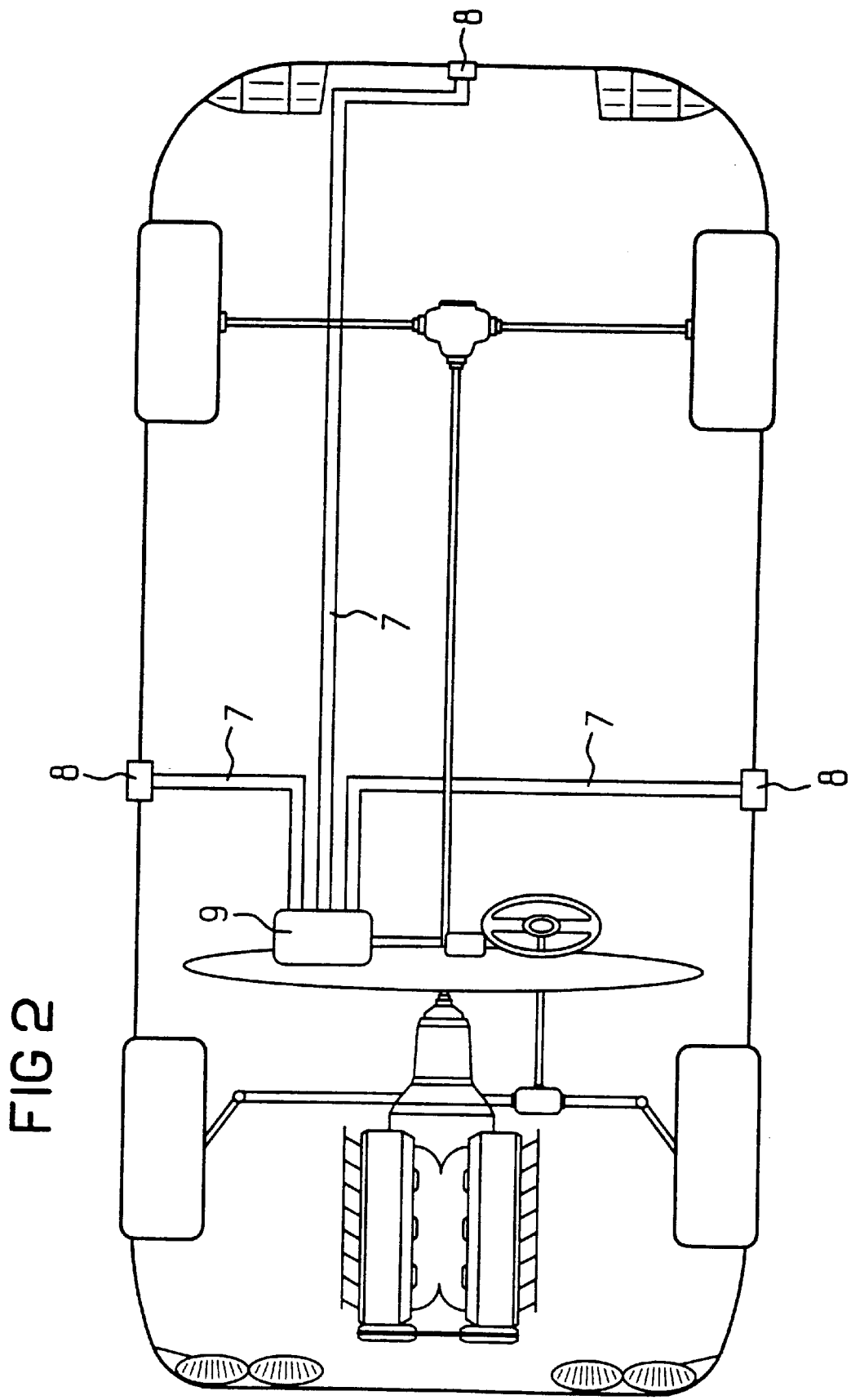
FIG. 2 is a schematic plan of a motor vehicle in which the transmission unit according to FIG. 1 is used.

According to FIG. 2, the antennas 8 can be disposed on all door handles and on the luggage compartment handle. The antennas 8 may also be distributed at any suitable location in the vehicle. The generator 1, the modulator 2, the amplifier 3 and the transformer 4 are centrally disposed in a housing (also referred to as controller 9).

Other electrical equipment in the motor vehicle is not interfered with, or only to a minor extent, by interference radiation due to transmission on the lines 7 because only sinusoidal signals are transmitted through the lines 7 to the antennas 8. These signals have no harmonics or only harmonics with very small amplitude.

It is advantageous if the lines 7 to the antennas 8 are constructed as twisted two-wire lines or as two-pole, shielded lines. The lines 7 exhibit very little interference, in other words, only little interference radiation proceeds from them. In addition, they exhibit very few losses, with the result that the power of the modulated oscillation is attenuated only to a small extent on the path to an antenna 8.

It is also possible for a plurality of groups 10 of antennas 8 disposed in parallel to be connected to the secondary winding 6 of the transformer 4. A changeover switch 11 can then be used to effect a changeover between the different groups 10. If, for example, one group 10' of antennas 8 is disposed in the interior space of the motor vehicle, then that group's alternating field preferably propagates in the interior space. If there are a sufficient number of antennas 8 disposed such that they are well distributed in the interior space, then the entire interior space is permeated by the field. The code carrier may then be situated at any desired location in the interior space and can reliably receive the signal transmitted by the transmission unit.

The other group 10" of antennas 8 connected in parallel may be disposed on the exterior of the motor vehicle or at least be disposed in the motor vehicle in such a way that the alternating field permeates the immediate surroundings around the motor vehicle (referred to as the exterior space). Consequently, a signal can be transmitted to a code carrier outside the motor vehicle through these antennas 8. The position and the location of the code carrier are then of secondary importance as long as the code carrier is situated within the alternating field and the antennas 8 are constructed such that they are well distributed in or on the motor vehicle.

In this way, the code carrier is reliably addressed as required in the interior or exterior spaces. In other words, it reliably receives the signals transmitted by the transmission unit.

Two air-core coils (primary and secondary windings) can be used as the transformer 4. It is also possible to use a transformer having an iron core. Transformers with taps are likewise possible, the antennas 8 being connected to partial turns of the secondary winding 6.

The way in which the transformer 4 is constructed is not essential to the invention. What is essential is that the transformer 4 transforms the modulated oscillation to the secondary side with sufficiently large amplitude. The transformer 4 is disposed centrally in this case. For use in a motor vehicle, it suffices if just a single transformer 4 is present. However, a plurality of transformers 4 may also be present, which transformers can then also be driven in a phase-shifted manner with respect to one another.

The linear amplifier is not absolutely necessary as long as the generator 1 provides sufficiently large signals or the transformer 4 has a sufficiently large amplifier effect.

The transmission unit according to the invention is constructed in a simple and reliable manner. It enables reliable identification of interior space and exterior space. In other words, code carriers are addressed optionally in the exterior or interior space. Virtually any desired number of antennas 8 can be connected to the transformer 4. With the transmission unit, moreover, one is not bound to the configuration of the motor vehicle (or of another object) in which the transmission unit is used.

The antennas 8 are preferably realized as coils. They can, therefore, be constructed to be very small and to be fitted virtually as often as desired in the object. Accordingly, the antennas 8 have hardly any influence on the geometrical form or the construction of the motor vehicle body.

With the transmission unit, the transmitted signals do not have to be adjusted to each other with regard to the two respective antennas 8, in terms of their phases and transmission powers, in order—as in the case of the prior art—to generate the best possible three-dimensional superposition field. If there are enough antennas 8 and they are disposed in different positions, then field components are obtained in all spatial directions simply by virtue of the geometrical distribution and construction of the antennas 8, and can then induce a sufficiently large voltage in the code carrier coil.

The transmission unit according to the invention is free of trimming and can be used without initial settings in any object. The transmission unit does not have transient recovery times because resonant circuits are not used. Consequently, significantly higher transmission rates (baud rates) can be realized for the transmission of the vehicle-specific data. Therefore, transmission process is concluded rapidly as well.

The generator 1 used is preferably a sine-wave generator (ring counter with filter) that generates signals (carrier oscillation) at a frequency of about 125 kHz. The carrier oscillation can be modulated to 100% in the modulator 2 if amplitude modulation with a binary signal is performed.

Other types of modulation can also be used in order to transmit the data at a high frequency.

A differential amplifier (not illustrated) with a connected full bridge may serve as the linear output stage. After amplification, the modulated oscillation is fed to the transformer 4. The transformer 4 then supplies the voltages that are necessary for field generation with the antennas 8 on its secondary side.

Resonance-dictated detuning and phase angles that would become apparent in a disadvantageous manner in a resonant circuit are precluded because the antenna 8 in the transmission unit according to the invention is not part of a resonant circuit. No interfering harmonics are generated thereby because the generator 1, modulator 2 and transformer 4 essentially operate with sinusoidal voltages and currents.

The transmission unit is required only for a short time, to be precise, only when a signal is to be transmitted. For this reason, the fact that the amplifier 3 may possibly have a high power loss is unimportant because the amplifier 3 is required only for a short time. The transmission unit is usually in operation for less than a second, to be precise, when a user wishes to enter the motor vehicle (unlocking or locking) or to start the vehicle (releasing the immobilizer).

If the antennas 8 are constructed as coils, they may also advantageously be used to receive signals that are transmitted by the code carrier (bi-directional communication at the same transmission frequency). If at least one antenna 8 receives signals, the signals are then tapped on the secondary winding 6 and fed through the central reception unit (not illustrated) to an evaluation unit, where the user-specific data are compared with stored, expected data.

I claim:

1. A transmission unit, comprising:
   a generator for generating a sinusoidal carrier oscillation;
   a modulator connected to said generator for modulating an information item to be transmitted onto said carrier oscillation into a modulated oscillation;
   a transformer connected to said modulator, said transformer having a primary side and a secondary side for transforming said modulated oscillation from said primary side to said secondary side; and
   a plurality of antennas connected to said secondary side for generating respective electromagnetic fields and aiding a transmission of the information item.

2. The transmission unit according to claim 1, wherein said plurality of antennas are connected in parallel to said secondary side.

3. The transmission unit according to claim 1, wherein said generator is a sine-wave oscillator.

4. The transmission unit according to claim 1, wherein said transformer is a step-up transformer stepping up the modulated oscillation with regard to voltage and current.

5. The transmission unit according to claim 1, wherein said plurality of antennas are coils connected in parallel with said secondary side and electrically connected to said secondary side.

6. The transmission unit according to claim 1, including twisted two-wire lines electrically connecting said plurality of antennas to said secondary side.

7. The transmission unit according to claim 1, including a two-pole, shielded line electrically connecting said plurality of antennas to said secondary side.

8. A transmission unit of an anti-theft protection system of a motor vehicle, comprising:
   a generator for generating a sinusoidal carrier oscillation;
   a modulator connected to said generator for modulating an information item to be transmitted onto said carrier oscillation into a modulated oscillation;
   a transformer connected to said modulator and having a primary side and a secondary side for transforming said modulated oscillation from said primary side to said secondary side; and
   a plurality of antennas connected to said secondary side for generating respective electromagnetic fields and aiding a transmission of the information item.

9. A method for transmitting an information item, comprising:
   providing a generator having a primary side and a secondary side, a modulator, a transformer, and a plurality of antennas;
   connecting the plurality of antennas to the secondary side of the transformer;
   creating an information item to be transmitted;
   generating a sinusoidal carrier oscillation;
   modulating the information item onto the carrier oscillation and forming a modulated oscillation;
   transforming the modulated oscillation from the primary side to the secondary side; and
   generating respective electromagnetic fields with the plurality of antennas to aid transmission of the information item.

10. The method for transmitting an information item according to claim 9, including the step of connecting the plurality of antennas in parallel to the secondary side.

11. The method for transmitting an information item according to claim 9, wherein the step of providing the generator includes providing a sine-wave oscillator as the generator.

12. The method for transmitting an information item according to claim 9, wherein the step of providing the transformer includes providing a step-up transformer, and stepping up the modulated oscillation with regard to voltage and current with the step-up transformer.

13. The method for transmitting an information item according to claim 9, wherein the step of providing the plurality of antennas includes providing coils, and electrically connecting the coils in parallel with the secondary side.

14. The method for transmitting an information item according to claim 1, including the step of providing twisted two-wire lines, and electrically connecting the plurality of antennas to the secondary side through the twisted two-wire lines.

15. The method for transmitting an information item according to claim 1, including the step of providing a two-pole, shielded line, and electrically connecting the plurality of antennas to the secondary side through the two-pole, shielded line.

16. A method for transmitting an information item in an anti-theft protection system of a motor vehicle, comprising:
   providing a generator having a primary side and a secondary side, a modulator, a transformer, and a plurality of antennas;
   connecting the plurality of antennas to the secondary side of the transformer;
   creating an information item to be transmitted;
   generating a sinusoidal carrier oscillation;
   modulating the information item onto the carrier oscillation and forming a modulated oscillation;
   transforming the modulated oscillation from the primary side to the secondary side; and
   generating respective electromagnetic fields with the plurality of antennas to aid transmission of the information item.

* * * * *